July 10, 1934.    A. W. DIACK    1,965,795
CIGARETTE AND CIGAR LIGHTER
Filed Jan. 19, 1927
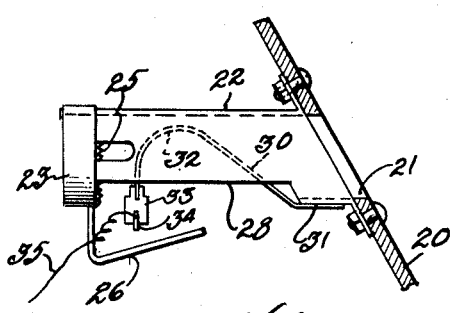
Fig. 1
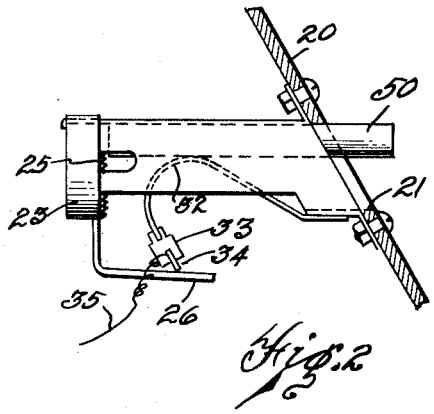
Fig. 2
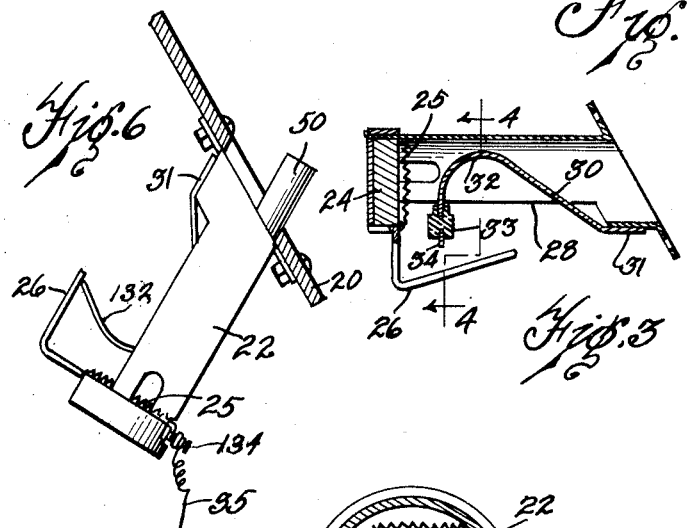
Fig. 6    Fig. 3    Fig. 7
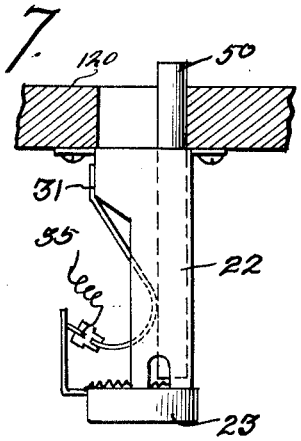
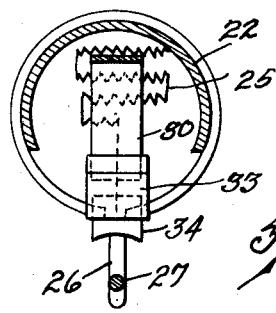
Fig. 4
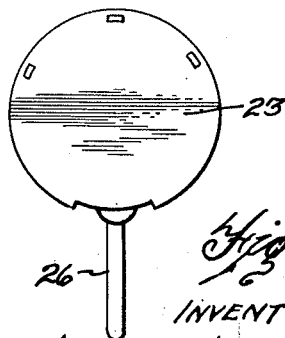
Fig. 5
INVENTOR
Archibald W. Diack
BY
Francis D. Hardesty
ATTORNEY.

Patented July 10, 1934

1,965,795

UNITED STATES PATENT OFFICE 1,965,795

CIGARETTE AND CIGAR LIGHTER

Archibald W. Diack, Ann Arbor, Mich.

Application January 19, 1927, Serial No. 161,982

7 Claims. (Cl. 219—32)

The present invention relates to cigarette and cigar lighters and particularly to automatic electric lighters.

It has been recognized by users of automobiles that any projection on the face of the instrument board was undesirable because of interfering with movement of driver and passenger. Also in the case of the ordinary types of cigar and cigarette lighters mounted thereon, the igniting element projects in front of the instrument board and is a definite source of danger as a short circuit may occur and cause the igniting element to become heated and its exposure on the front of the instrument board is liable to burn the person or the clothes of the passenger. Among the objects of the present invention therefore is the elimination of such projections and the placing of the igniting element behind the instrument board so that accidental contact therewith is substantially impossible.

Another object of the invention is a lighter that is simple, cheap and effective.

Another object is a lighter which, when used as an automobile accessory, requires the use of only one hand and does not distract the attention of the driver from the road.

Still other objects will readily appear to those skilled in the art upon reference to the following description and accompanying drawing, in which:

Fig. 1 is a side view of the lighter mounted upon, for example, the instrument board of an automobile;

Fig. 2 is similar view showing a cigarette in position to be lighted and the parts in operating position;

Fig. 3 is a longitudinal section through the device;

Fig. 4 is a section on line 4—4 of Fig. 3, somewhat enlarged;

Fig. 5 is a rear view of the device on the scale of Fig. 4;

Fig. 6 is a view similar to Fig. 2 showing a different way of locating the device;

Fig. 7 is a view similar to Fig. 2 showing a slightly modified form.

As indicated in the drawing, the device comprises broadly a holder within which the cigar or cigarette may be thrust, a retaining means for gripping and holding the cigar or cigarette in position, and an igniter in the end of the holder with means for automatically completing an electric circuit through the igniter.

In the drawing, an automobile instrument board is represented at 20 and is shown as provided with an opening 21. Behind opening 21 is a short tubular holder 22, which may be closed at its rear end by suitable means such as cap 23. Within the rear end of holder 22 is a small piece of refractory insulating material 24 upon which is mounted a resistance heater element 25 facing toward the open end of the holder. Element 25 will be grounded at one end when the device is used on automobiles, and at its other end will be connected electrically to a contact member 26. It is preferred to make the latter of a piece of flexible conducting wire as shown for reasons to be given later. This contact preferably extends outward and is bent over at an angle as shown to provide a longitudinally extending portion. In the form shown, the wire 26 protrudes from the holder 22 through an opening 28.

This opening 28 is of considerable area and mounted in it is a wide flat spring member 30 preferably fixed to holder 22 at the forward end as at 31 in any suitable manner. I prefer to solder this spring member in position so that, should a short circuit occur, having this member 30 as a portion of such circuit, the solder will melt and open the circuit. Spring 30 is preferably bent in about the form shown to produce a curved portion 32 which in rest position lies near the opposite side of holder 22. Spring member 30 carries at its free end a small piece of insulating material 33 and this in turn carries a small metal conducting plate 34 connected with a suitable source of electric current (not shown) by a flexible lead 35. It is preferred to make plate 34 rather wide and to curve inwardly the outer edge as shown at 36 in Fig. 4, so that it will always contact readily with wire 26 and the latter not readily shake off laterally. The electric circuit will, of course, be through lead 35, contacts 34 and 26, through element 25 to the ground or other return.

The operation of the device would seem obvious from the above and from the drawing. A cigarette 50, for example, is inserted in holder 22 to contact with element 25 and in so doing lifts spring 30 so as to bring contacts 34 and 26 together and thereby complete the circuit through element 25. The latter reaches kindling temperature and ignites the end of the cigarette 50 after a short interval.

Fig. 6 shows a form of the device which is the same as that of Figs. 1 and 2 except that it is mounted somewhat differently and the electrical connection is reversed. In this form the holder 22 extends downwardly instead of horizontally, and instead of leading in current to an insulated contact 34, the lead in is to a binding post 134 connected with the rear end of igniting element 25. In this case the post 134, element 25 and contact 26 are all insulated from holder 22, and the spring 132, being grounded at 31, forms the return lead. Otherwise the action of the device is the same as with the first forms.

Fig. 7 shows a form of the device for mounting in a table top 120 or portable holder, the active parts being identical with those of Figs. 1 to 6. In this form, of course, the return lead will be the usual flexible wire. This form of the device may, of course, be designed to use the usual house lighting current.

While the device has been shown and described as mounted horizontally or vertically, the angle is immaterial, as this may be changed to meet conditions of service.

As mentioned above, it is preferred to make contact member 26 of flexible material so that the movement of spring 30 will not be too restricted. With sufficient flexibility of member 26 and the proper size holder 22 the device may be made to accommodate either cigarettes or cigars, although primarily intended for the former.

This device is distinctly different from all other lighters in that advantage is taken of the fact that a cigarette and cigar can be lighted by mere contact with a hot wire, provided there is free access of air, and suction is not necessary as in other lighters. Such access of air is provided for by forming the igniting element 25 in the form of a fine coil as shown in the drawing and mounting it upon the face of the insulation 24 with its axis substantially parallel thereto. This arrangement allows air to pass up between and around the flights of the coil into contact with the heated combustible material of the cigar or cigarette. Also, when the device is applied to automobiles, the jarring of the machine automatically clears the ashes and carbonized particles from the heating unit.

Having now described the invention and the preferred forms of embodiment thereof, it is to be understood that the said invention is to be limited not to the specific details herein set forth and illustrated but only by the scope of the claims which follow.

I claim:—

1. A device of the character described comprising a tubular holder into which a cigarette may be inserted, said holder having a closed end, an electric igniting element in said closed end and insulated therefrom, a contact member connected to one end of said element, a spring contact member normally out of contact with the first contact member, said spring arm extending into said holder and adapted to be moved by a cigarette to cause said contacts to come together, electric connections between the other end of said element, and one pole of a source of electricity and electric connections between said spring mounted contact and the other pole of said source.

2. A device of the character described comprising a tubular holder into which a cigarette may be inserted, said holder having a closed end, an electric igniting element in said closed end and insulated therefrom, a flexible contact member connected to one end of said element, a spring contact member normally out of contact with the first contact member, said spring arm extending into said holder and adapted to be moved by a cigarette to cause said contacts to come together, electric connections between the other end of said element and one pole of a source of electricity and electric connections between said spring mounted contact and the other pole of said source.

3. A device of the character described, comprising a tubular holder into which a cigarette may be inserted, an electric igniting element in said holder adapted to abut the end of said cigarette, said element being insulated from said holder, electric connection between one end of said element and a source of current, a contact member carried by the other end thereof, a spring contact member connected to said holder and normally out of contact with the first member but adapted to be moved into contact when a cigarette is inserted in said holder and an electric return lead from said holder to said current source.

4. A device of the character described comprising a tubular holder into which a cigarette or cigar may be inserted, said holder having a closed end, an electric igniting element on said closed end, a contact member connected to one end of said element, a second contact member normally out of contact with the first contact member, said second contact member extending into said holder and adapted to be moved by a cigarette or cigar to cause said contacts to come together, one of said members being resilient, electric connections between the other end of said element and one pole of a source of electricity and electric connections between said second contact member and the other pole of said source.

5. A device of the character described comprising a tubular holder into which a cigarette may be inserted, said holder having a closed end, an electric igniting element in said closed end and insulated therefrom, a flexible contact member connected to one end of said element, a spring-actuated contact member normally out of contact with the first contact member, said spring-actuated member extending into said holder and adapted to be moved by a cigarette to cause said contacts to come together, electric connections between the other end of said element and one pole of a source of electricity and electric connections between said spring mounted contact and the other pole of said source.

6. A lighter for cigars or cigarettes, comprising a socket, an electric igniting element at one end of the socket, and means projected into the path of the article to be lighted and movable thereby to close a circuit through the igniting element, said means comprising a spring actuated displaceable arm extending into the socket.

7. A lighter for cigars or cigarettes, comprising a socket, an electric igniting element at one end thereof, means to yieldably hold the cigar or cigarette in a certain position in the socket, and means operated by the yielding movement of said holding means to automatically close a circuit leading to said igniting element, when a cigar or a cigarette is positioned within the holding means.

ARCHIBALD W. DIACK.